(12) United States Patent
Rintanen

(10) Patent No.: US 9,410,804 B2
(45) Date of Patent: Aug. 9, 2016

(54) TECHNIQUES FOR POSITIONING A VEHICLE

(75) Inventor: Kari Rintanen, Espoo (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 119 days.

(21) Appl. No.: 14/112,872

(22) PCT Filed: Apr. 20, 2012

(86) PCT No.: PCT/FI2012/050392
§ 371 (c)(1),
(2), (4) Date: Oct. 18, 2013

(87) PCT Pub. No.: WO2012/143616
PCT Pub. Date: Oct. 26, 2012

(65) Prior Publication Data
US 2014/0046587 A1 Feb. 13, 2014

(30) Foreign Application Priority Data
Apr. 21, 2011 (FI) ........................................ 20115397

(51) Int. Cl.
*G01C 3/08* (2006.01)
*G01S 7/48* (2006.01)
*G01S 17/42* (2006.01)
(Continued)

(52) U.S. Cl.
CPC ............... *G01C 3/08* (2013.01); *B66C 19/007* (2013.01); *B66F 9/063* (2013.01); *G01C 21/12* (2013.01); *G01S 7/4808* (2013.01); *G01S 17/42* (2013.01); *G01S 19/45* (2013.01); *G01S 19/48* (2013.01); *G05D 1/024* (2013.01); *G05D 1/027* (2013.01); *G05D 1/0272* (2013.01); *G05D 1/0278* (2013.01); *G05D 2201/0205* (2013.01)

(58) Field of Classification Search
None
See application file for complete search history.

(56) References Cited

U.S. PATENT DOCUMENTS

| 5,467,273 A | 11/1995 | Faibish et al. |
| 5,949,371 A | 9/1999 | Nichols |
| 6,208,916 B1 * | 3/2001 | Hori .................... G05D 1/0246 180/169 |

(Continued)

FOREIGN PATENT DOCUMENTS

| EP | 0 185 816 A1 | 7/1986 |
| EP | 1 983 397 A2 | 10/2008 |

(Continued)

OTHER PUBLICATIONS

Jenkin et al., "Global navigation for ARK", Proceedings of the 1993 IEEE/RSJ International Conference on Intelligent Robots and Systems, Jul. 26-30, 1993, pp. 2165-2171.

*Primary Examiner* — John R Olszewski
*Assistant Examiner* — James M McPherson
(74) *Attorney, Agent, or Firm* — Birch, Stewart, Kolasch & Birch, LLP

(57) ABSTRACT

A system for determining a location of a vehicle in an environment provided with at least two landmarks whose location is known. The system includes at least one scanning distance sensor installed in the vehicle and configured to measure distance and direction from the vehicle to the at least two landmarks, as well as a data processing device configured to store in its memory the location of the at least two landmarks; and determine the location of the vehicle on the basis of at least the location of the at least two landmarks as well as the distance and direction from the vehicle to the at least two landmarks.

18 Claims, 7 Drawing Sheets

(51) Int. Cl.
*G01S 19/48* (2010.01)
*G05D 1/02* (2006.01)
*B66C 19/00* (2006.01)
*B66F 9/06* (2006.01)
*G01C 21/12* (2006.01)
*G01S 19/45* (2010.01)

(56) References Cited

U.S. PATENT DOCUMENTS

| | | | |
|---|---|---|---|
| 6,259,403 B1 | 7/2001 | Nichols | |
| 7,305,287 B2 * | 12/2007 | Park | G05D 1/0289 180/168 |
| 8,442,791 B2 * | 5/2013 | Stahlin | 702/94 |
| 2004/0062419 A1 * | 4/2004 | Roh | G06K 9/00664 382/104 |
| 2009/0222159 A1 | 9/2009 | Bauer | |
| 2010/0152944 A1 * | 6/2010 | Kouno | G05D 1/024 701/26 |
| 2011/0010023 A1 * | 1/2011 | Kunzig et al. | 701/2 |
| 2012/0081248 A1 * | 4/2012 | Kennedy et al. | 342/118 |
| 2012/0330492 A1 * | 12/2012 | Douglas et al. | 701/23 |

FOREIGN PATENT DOCUMENTS

| | | |
|---|---|---|
| EP | 2 006 708 A1 | 12/2008 |
| FI | 104445 B | 1/2000 |
| JP | 11-183174 A | 7/1999 |
| JP | 2007-322138 A | 12/2007 |
| RU | 2 210 492 C2 | 6/2001 |
| RU | 2 279 343 C2 | 9/2004 |
| RU | 2 289 145 C2 | 2/2005 |
| WO | WO 97/38326 A1 | 10/1997 |
| WO | WO 2010/119180 A1 | 10/2010 |

* cited by examiner

TECHNIQUES FOR POSITIONING A VEHICLE

FIELD OF THE INVENTION

The invention relates to a method and an arrangement for positioning a vehicle on the basis of landmarks provided in known places. In connection with this invention, a vehicle refers to a device capable of moving controlled by people and/or automation, and no intention is made to restrict the term to the definition of a vehicle set forth in road traffic legislation.

BACKGROUND OF THE INVENTION

The invention is now described using as an illustrative but non-limiting example a container handling system in a container terminal, such as a port. In the following, operation of a typical container port will be explained to an extent necessary for understanding the operation of the invention.

FIG. 1 shows unloading and loading of a container ship 2 by means of a ship crane 4 when the port is operated by straddle carriers 3. Containers 1 are lifted up from container silos of the container ship 2 by means of a container gripper suspended from ropes of the ship crane 4, and lowered into a desired lane 7 on a quay 5. Next, the straddle carriers 3 pick up containers 1A, 1B unloaded from the ship from the ground and transport the containers to a container depot field. When loading a ship, the procedure is reverse. Then, the straddle carriers 3 bring containers 1C to be loaded from the container depot field and lay them beneath the ship crane 4, into a desired lane 7, wherefrom the ship crane 4 then picks them up and lifts on board the ship 2.

Referring to FIG. 1, a vast majority of international transport of goods takes place by means of containers 1. The containers are standard-shaped transport units in which goods are packed for the duration of transport. Typically, containers come in three different sizes of 20 feet, 40 feet or 45 feet in length. The width of a container is about 2.5 meters. The containers arrive at and, correspondingly, leave a container port transported by a container ship 2, container trucks or container trains. A standard-shaped transport unit makes the goods considerably quicker to handle during different stages of transport, particularly when loading and unloading a container ship, as well as when changing from sea transportation to land transportation and vice versa.

The containers are handled in the container port by particular container cranes 3 which include straddle carriers, Rail Mounted Gantry Cranes or RMG cranes, Rubber Tyred Gantry Cranes or RTG cranes, reach stackers, various fork lift trucks, as well as tractor-trailer combinations. A particular type of a rail mounted gantry crane is a ship crane 4 used for lifting containers to be unloaded from a ship onto a quay 5 and, correspondingly, for loading containers brought to a quay on board a container ship.

The aforementioned straddle carrier, for instance, is capable of moving on its rubber tyres around the port area, picking up containers from the ground or from container stacks, and stacking containers on top of one another or placing a container on a container truck bed or on the ground. When containers are laid down on the ground in the port area, they are typically placed in particular container squares 6 or in separate lanes 7 which are designated e.g. by painting on the ground and named or numbered to enable the locations of the containers to be easily recorded.

A current aim is to automate the container cranes 3 so as to make the work of a container crane operator easier and quicker, or the operator may be completely eliminated from the container handling machine, in which case the container handling machine operates without an operator, unmanned.

If the aim is to facilitate the operator's work, typically, then, some work phase in a work cycle is carried out automatically, controlled by a computer. The aim is then to speed up that particular work phase, to increase accuracy, reliability or safety, or merely to facilitate the operator's work.

If the operator is completely eliminated from the control cabin of the container handling machine and the container handling machine operates unmanned, a significant portion of the work phases of the container handling machine is then carried out automatically, controlled by a digital control device (data processing device, in short "computer"). Work phases which cannot be reliably carried out automatically by a computer may, as is previously known, be carried out by utilizing a particular remote control technique, in which case one or more persons for some time control the container handling machines remote-controllably by means of real-time camera footage and radio connection, for instance. The unmanned control of container handling machines enables considerable savings in costs since it then becomes possible to use a large number of container handling machines by few employees.

Some important tasks to be automated are: a) automatic driving of a container handling machine by following desired paths and b) automation of container records.

As will be understood by one skilled in the art, if a container handling machine is to operate without an operator, the characteristic according to a) is essential since typically most of the work cycle time is consumed by driving the container handling machine in the port area. The characteristic of b) is useful in both unmanned and manned operation.

A common requirement for the automation of characteristics a) and b) is that the location of the container handling machine 3 in the port area has to be known, typically at an accuracy of about 10 centimeters. The present invention facilitates the automation of container handling by enabling the accurate location and travel direction of the container handling machine 3 to be determined in real-time.

Next, reference is made to FIG. 2. First, the container handling machine 1) has to be provided with a positioning system 8 capable of measuring the location of the container handling machine constantly at an accuracy of about 10 centimeters. Second, 2) if the measured location differs from a desired or planned route 17 of the container handling machine, the actuators of the container handling machine have to be controlled such that the container handling machine returns to the desired route 17. Typically, condition 2) is not problematic for the container handling machines 3 as far as implementation techniques are concerned if condition 1) can be met. Condition 1), instead, has proven to be difficult to fulfil by employing the known techniques.

As will be understood by a person skilled in the art, for the sake of safety reasons, an unmanned container handling machine cannot be moved at all by a computer unless the real location or travel direction of the container handling machine is known. If the container handling machine were moved by a computer without knowing the real location or travel direction, a danger would arise of the container handling machine colliding with containers, other cranes or other buildings possibly residing along the planned route. Consequently, an absolute requirement to be set for the positioning system 8 is that the measured location data has to be constant with no interruptions to the location measurement by any external disturbing factor.

As will also be understood by a person skilled in the art, the location and direction data measured by the positioning system 8 has to be delay-free and real-time, since the container handling machine 3, such as a straddle carrier, may move a distance of up to ten meters per second, which means that possible deviations from the desired route have to be detected as soon as possible in order to avoid dangerous situations. A measurement frequency typically considered sufficient is about 10 . . . 20 location measurements per second.

As was stated above, another use for the positioning system 8 of a container handling machine according to the invention is associated with automation of container records and automatic monitoring of the location of containers in a port area. After a container 1 has been unloaded from a ship 2, a container handling machine (either controlled by a person or under automatic control by a computer) takes the container to a particular container depot field wherein the containers are typically placed in rows and stacks. The container rows and single container storage places 6 or container squares 6 thereof (cf. FIG. 2) are typically painted on the ground and designated such that each container square may be unambiguously identified and thus the container squares separated from one another in the container records. The single containers are stacked on top of one another in these squares. The location of each single container (typically the identifier of a container square and height in a stack) in the depot field is stored in a particular container Terminal Operating System or TOS provided with an appropriate database. The aim is currently to automate the monitoring of the location of a container in each phase of the handling in order to avoid problems caused by human errors, particularly those made by the operators of the container handling machines 3. If in the depot field the operator of the container handling machine takes the container 1 to a location 6 different from what is assumed by the TOS or, alternatively, the operator of the container handling machine enters into the TOS an erroneous location of the container, it will be problematic to find the container in the container depot field later. In particular, if the container has to be looked for in the depot field while a ship is being loaded, the costs become very high because the aim is expressly to minimize the unloading and loading times of ships in ports.

The prior art enables the location of a container in the container deposit field to be monitored e.g. by using satellite positioning technology (GPS) when no large structures, such as cranes or buildings, are present in the area to interfere with propagation of GPS signals. In such a case, the container handling machine 3 is accordingly provided with a GPS receiver antenna 12 and GPS apparatus for monitoring the location of the container handling machine at intervals of 1 second, for instance. Further, by electrically monitoring the operations of twist-locks of the container handling machine 3, it is possible to detect instances of grabbing a container and leaving a container in a container stack or on the ground at a given moment. As it is naturally assumed that the container 1 does not move without some container handling machine 3 moving it, it is thus possible to monitor the location of the container as long as the container handling machine moves in an open area, within the coverage area of GPS positioning satellites.

However, the GPS positioning technology does not work reliably within the entire port area since the GPS device antenna 12 has to maintain visual communication typically to at least five GPS satellites simultaneously in order to be able to calculate a location reliably. Large container cranes 3, such as a ship crane 4, prevent GPS radio signals from propagating therethrough free of interference, thus causing shadow areas and a decrease in accuracy in the GPS positioning. As the container squares 6 may be located side by side at a distance of about the width of a container, i.e. 2.5 meters, from one another, the accuracy of the GPS positioning should be considerably more accurate than this in order for a container square 6 or a drive lane 7 to be determined correctly. For instance, it is impossible for the GPS technology to reliably detect in which location or in which lane 7 in particular (cf. FIG. 1) beneath a ship crane the container handling machine 3 leaves a container, or from which lane the container handling machine picks up a container. A similar problem occurs when GPS positioning is used in the vicinity of or beneath other large container cranes 3 (e.g. RTG or RMG cranes).

When unloading a ship, for instance, a particular problem is presented by a situation wherein more than one container has been laid onto the ground on the quay, e.g. in adjacent lanes, by the ship crane 4. In FIG. 1, the containers 1A and 1B, for instance, present such a situation. If no positioning data from the container handling machine is available, it is then impossible to know for sure which one of the containers the container handling machine 3 arriving beneath the crane picks up. Consequently, it is also impossible to know for sure in which locations in the container deposit the containers 1A and 1B eventually end up, thus making it impossible to automatically monitor the location of the containers. Similarly, when loading a ship, it is impossible to know for sure in which lane the container handling machine 3 leaves a container. In FIG. 1, a container 1C illustrates this problem. In such a case, it is impossible to automatically ensure that the container 1C becomes loaded correctly on board the ship.

Of course, it is possible that when unloading and loading a ship, someone is arranged on the quay 5 to oversee the operation and e.g. to ensure that the container handling machines 3 and the ship crane 4 pick up the correct containers. However, this phase is subject to human errors which, by means of automation, are to be eliminated. Furthermore, anyone present on the quay is not only an additional cost factor but also a possible presenter of danger situations since accidents happen in ports, even killing people run over by a container handling machine.

EP 0185816 A1, for instance, discloses a technique for positioning a vehicle by means of a laser scanner and retroreflective reflectors. However, the publication discloses no working techniques for positioning a vehicle at all but incorrect conclusions are systematically made from location determination. The techniques of EP 0185816 A1 based on triangulation could work if the directions from the vehicle to the landmarks were absolute directions bound to the ground but, as the vehicle turns with respect to the ground, this is not the case. Since the position of the vehicle is unknown, the techniques of EP 0185816 A1 systematically suffer from the problem that there are more unknown than known factors, making groups of equations—were such presented—impossible to solve.

BRIEF DESCRIPTION OF THE INVENTION

It is thus an object of the invention to provide a method and an apparatus implementing the method so as to enable at least one above-mentioned problem to be alleviated or eliminated. The object of the invention is achieved by a method and a system which are characterized by what is disclosed in the independent claims. Preferred embodiments of the invention are disclosed in the dependent claims.

An aspect of the invention is a system for positioning a vehicle in an environment provided with at least one landmark whose location is known. The system includes at least one scanning distance sensor installed in a vehicle and configured to measure the distance and direction from the vehicle to said at least one landmark. The system further includes a data processing device configured to store in its memory the location of said at least one landmark; and determine the location of the vehicle on the basis of the location of said at least one landmark as well as the distance and direction from the vehicle to said at least one landmark.

Another aspect of the invention is a method of positioning a vehicle in an environment provided with at least one landmark whose location is known. The method includes the following steps carried out by a data processing device: 1) receiving from at least one scanning distance sensor installed in the vehicle the distance and direction from the vehicle to said at least one landmark; 2) storing in memory the location of said at least one landmark; and 3) determining the location of the vehicle on the basis of the location of said at least one landmark as well as the distance and direction from the vehicle to said at least one landmark.

The container handling machine positioning system according to the invention is thus based on scanning distance sensors installed in a vehicle, e.g. a container handling machine, and landmarks provided in known locations. A distance sensor is typically a sensor based on laser technology, measurement of travel time of a laser beam in particular, but the system according to the invention may also be implemented by another sensor providing the corresponding measured quantities. In the sense meant by the invention, a landmark is an object provided in a known location and having a well-defined set of characteristics enabling the landmark to be distinguished from other objects in the field of vision of the scanning distance sensor. Such a set of characteristics may include the shape of the landmark. The shape of the object in the field of vision of the distance sensor may be determined e.g. by measuring the distance to the object in a plurality of directions at time intervals short enough to enable the distance travelled by the vehicle during measurement of the plurality of directions and the distance to be ignored. If the shape of the object detected on the basis of the plurality of directions and the distance corresponds to the shape of the landmark stored in the memory of the data processing device, the detected object may be considered to be a landmark. Preferably, the shape of a landmark is cylindrical since such a landmark looks the same irrespective of the viewing direction. Instead of or in addition to shape, the set of characteristics of landmarks may by way of example include size and/or colour.

It is advantageous that, in order to improve the accuracy of location data, the system measures the distance and direction from the vehicle to at least two landmarks. The vehicle may, however, get into situations wherein it is impossible to measure the distance to two landmarks at the same time. This residual problem may be solved such that the system is configured to measure said distance and direction from the vehicle to at least two landmarks at two separate measurement times and determine a change in the position and/or location of the vehicle during the time between these two separate measurement times. A change in the location of the vehicle during the time between the measurement times may be determined by satellite positioning, for instance. Alternatively, a technique may be used which at least for a limited time is capable of determining changes in the location and position of the vehicle. A gyroscope installed in the vehicle is an example of such technology. Alternatively, changes in the location and position of the vehicle may be determined by monitoring the angles of control wheels of the vehicle and a distance measurement sensor whose calibration data may be based e.g. on the known location data concerning the landmarks. In such a case, the location of the vehicle may be determined by using dead reckoning, i.e. without external observation, if said at least one landmark cannot be detected.

A characteristic feature of the invention is thus the use of distance sensors for positioning a vehicle on the basis of known locations of landmarks. Furthermore, the danger of the vehicle colliding may be reduced by using information given by the distance sensors on possible obstacles in the travel direction of the vehicle. If an obstacle with which a collision might happen is detected in or near the travel direction of the vehicle, the system may stop the vehicle. This is a particularly advantageous characteristic when the system is configured to control the vehicle automatically, in some situations even unmanned.

It is known per se that scanning laser sensors may also be used in unmanned operation as safety sensors of a container handling machine in order to prevent collisions. An unmanned container handling machine, such as a straddle carrier, may be provided with a collision prevention sensor system which may be implemented by scanning laser sensors. In order to ensure that the container handling machine does not collide with people, containers, other container handling machines or buildings possibly residing along the planned route, the container handling machine may be provided with typically four scanning laser sensors capable of seeing objects in their surroundings e.g. up to a distance of 30 . . . 80 meters, within a scanning area of 180 degrees, for instance. The invention and its preferred embodiments enable the same sensor system also to be used for positioning a vehicle, such as a container handling machine, by means of particular fixed landmarks with known locations. Using the same sensors for several different purposes enables considerable savings in costs to be achieved.

In a typical but non-limiting implementation of the invention, the vehicle is a container handling machine or another device configured to move cargo from one place to another. The system according to the invention may then promote the automation of logistics such that the control system is configured to determine the unloading site of the cargo transported by the vehicle by determining the location of the vehicle at the time when the vehicle unloads the cargo. In other words, the control system of the vehicle may inform e.g. the logistics system of a port or another cargo terminal that the container transported by the vehicle resides in a location which is determined by the location of the vehicle at the time when the vehicle unloads the cargo. In addition, the system may be configured to identify cargo on the basis of the location from which the vehicle picks up the cargo. In other words, information is provided by the logistics system indicating that a particular container resides in a particular location, and when the vehicle picks up the container from this location, information on the identity of the container is provided by the logistics system.

BRIEF DESCRIPTION OF THE FIGURES

The invention is now described in closer detail in connection with the preferred embodiments and with reference to the accompanying drawings, in which.

DETAILED DESCRIPTION OF THE INVENTION

Figure 4:
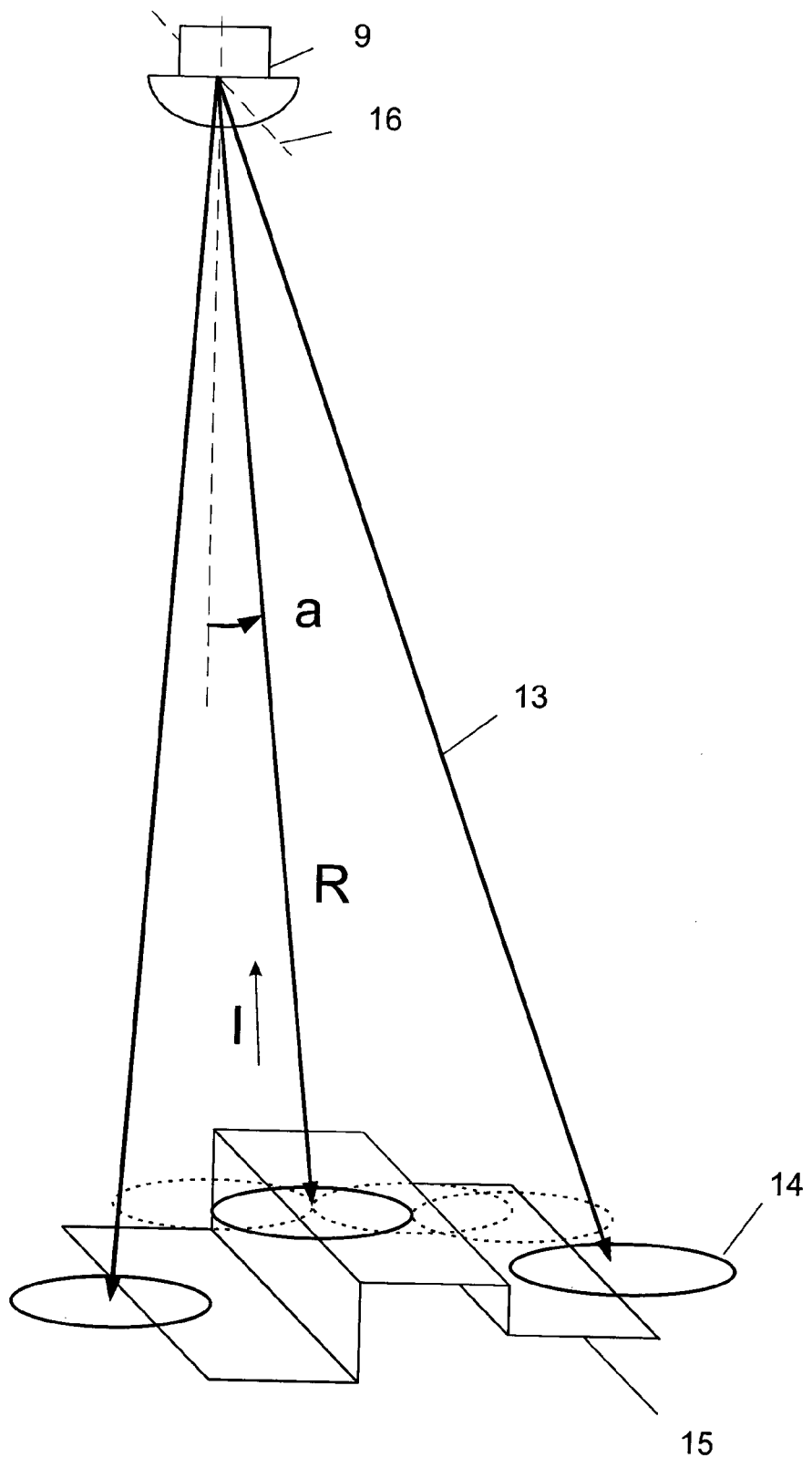
FIG. 4 shows an operating principle of a scanning laser sensor.

FIG. 4 shows an operating principle of a scanning laser sensor 9. The laser distance sensor emits a laser light pulse 13 which is reflected from an object 15 possibly hitting a beam 14, and some of the laser light returns to a light receiver of the laser distance sensor. The laser distance sensor determines the travel time of light between emitting and receiving the light pulse and on the basis of the travel time calculates a distance R of the reflecting object. The laser distance sensor is fastened to a rotor rotating about its axle 16, and laser light pulses 13 are emitted frequently. Typically, then, the laser beams 14 overlap one another, in which case no gaps are left between the laser light pulses, enabling even small objects 15 to be detected. Using its internal sensor system, the scanning laser distance sensor 9 also measures an emission angle a of the laser beam 13.

Referring to FIG. 4, the operation of the scanning laser distance sensor 9 is described at an extent necessary for understanding the operation of the system according to the invention.

In a first phase, the laser distance sensor emits a laser light pulse 13 whose beam width 14 is typically about 10 ... 20 cm as measured at a distance of 20 meters. The emitted laser light may be visible to the eye or invisible to the eye (e.g. infrared radiation, IR laser). In a second phase, the emitted light pulse is reflected from an object 15 possibly hitting the beam 14, and some of the laser light returns to the light receiver of the laser distance sensor. The laser distance sensor is still capable of detecting the reflection of the laser light pulse 13 at a distance of 40 meters, for instance, even if the reflecting object were matte black in colour and only reflected back 10 percent of the light that hit it. If the object is lighter in colour, such as a landmark 11, and reflects most of the light (e.g. 90 percent) hitting it, it is also possible to detect objects at a much greater distance, even at a distance of a hundred meters. In a third phase, the laser distance sensor determines the travel time of light between emitting and receiving the light pulse. In a fourth phase, the distance R of the reflecting object to the laser sensor is calculated on the basis of the travel time of light, and the reading is outputted to a user of the sensor. Typically, in addition to the distance information R, the strength I of measured echo is also outputted, which is proportional to the distance and colour of the reflecting object.

Still referring to FIG. 4, the scanning laser distance sensor 9 operates such that the above-described laser distance sensor is fastened to a rotor rotating fast (e.g. 50 rounds per second) about its axle 16, and laser light pulses 13 are emitted frequently such that immediately after a previous distance R measurement is completed a next light pulse is emitted. Typically, then, the laser beams 14 overlap one another, in which case no gaps are left between the laser light pulses, enabling even small objects 15 to be detected.

Typically, the rotating axle 16 of the scanning laser distance sensor is set perpendicularly against the laser light beams 13. The scanning laser distance sensor is naturally capable of measuring the emission angle (rotation angle a) of the laser beam 13 in real time by the internal sensor system.

Typically, the sensor 9 thus provides the following information for each single laser distance measurement: measurement angle a, measured distance R, and possibly reflection strength I as well.

As was stated above, the system according to the invention may also be implemented by other sensors providing measured variables {a, R} or {a, R, I}, and is thus not restricted to the use of laser technology only.

Figure 1:
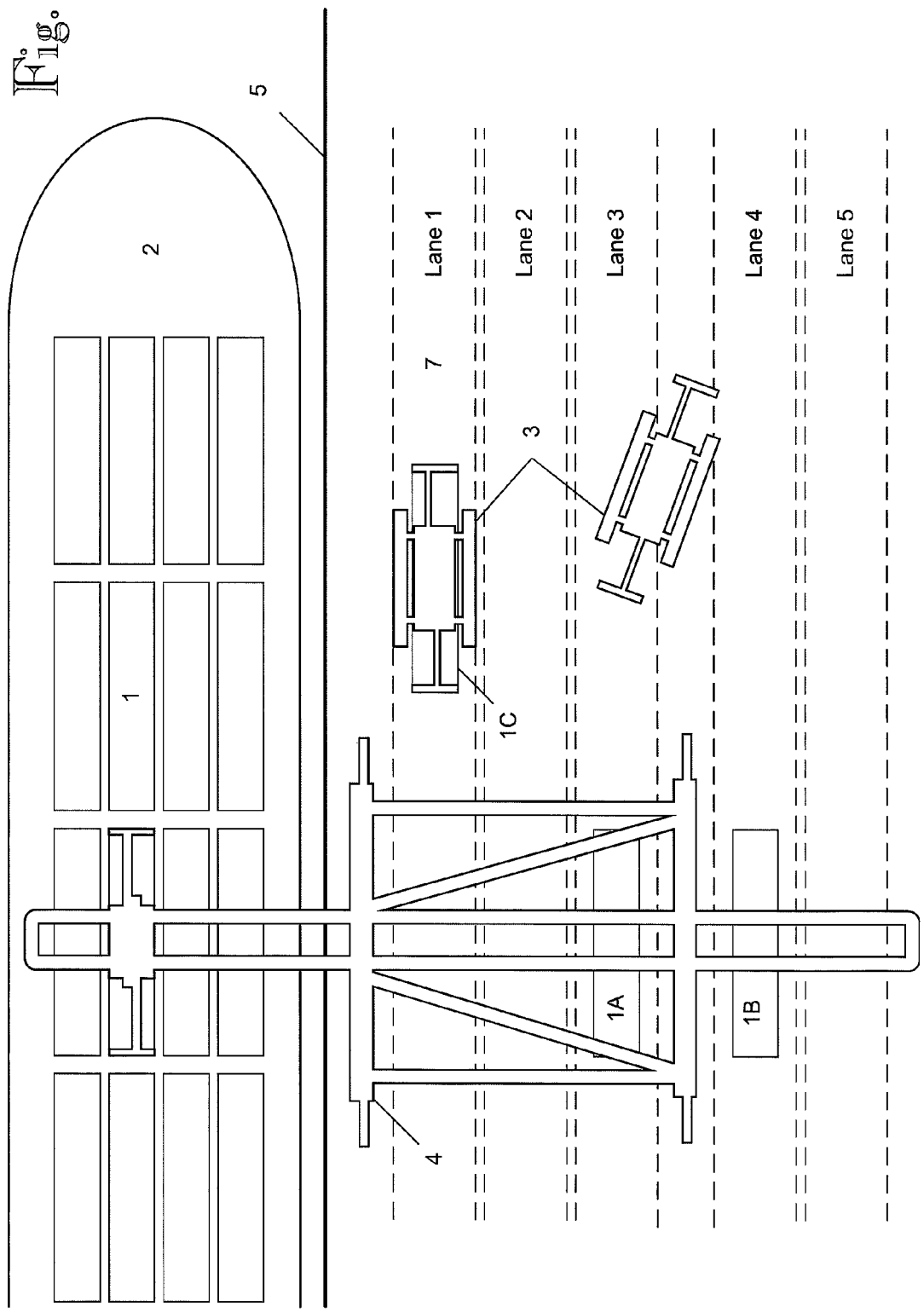
FIG. 1 shows unloading and loading a container ship by means of a ship crane when a port is operated by straddle carriers.
Figure 2:
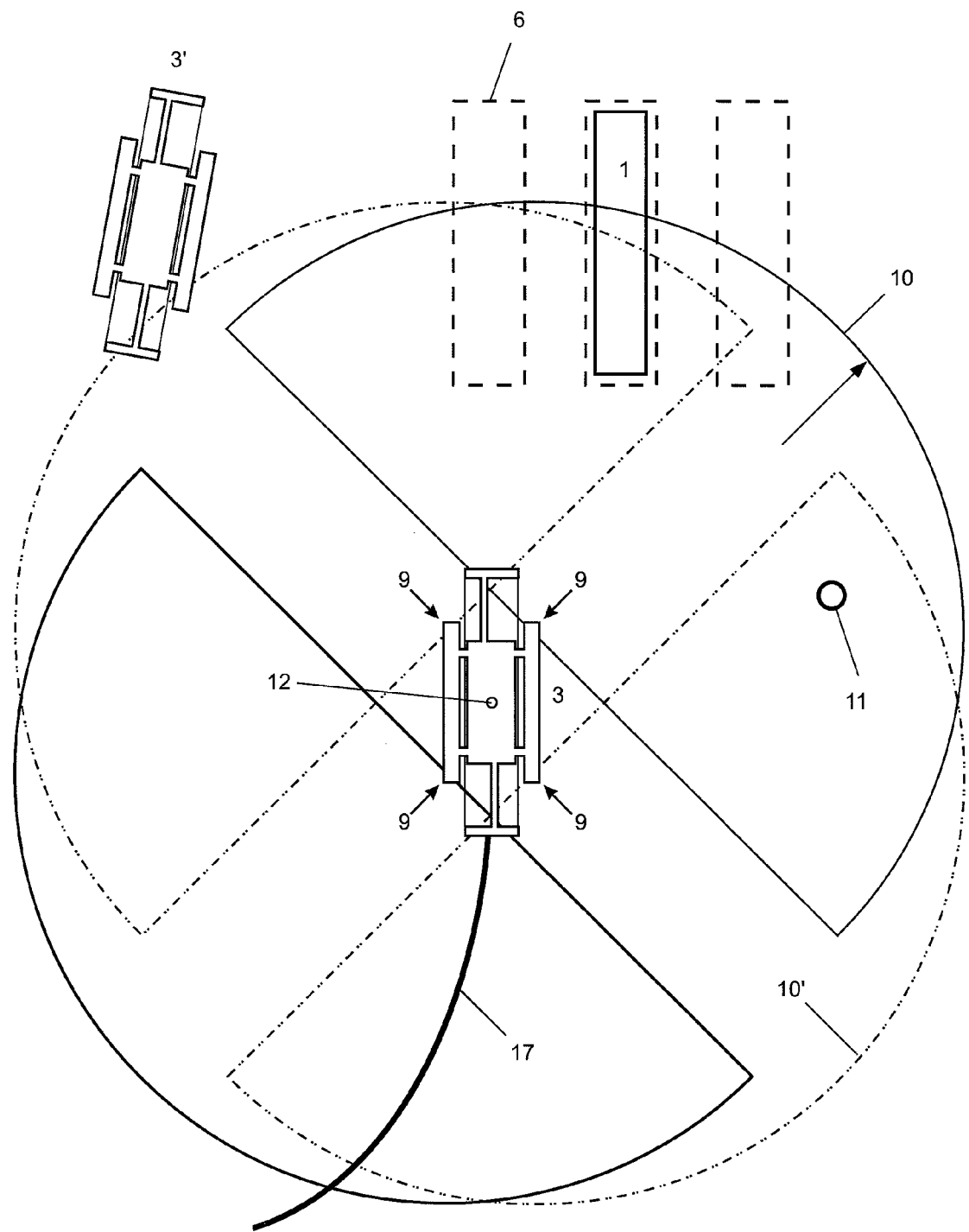
FIG. 2 shows a container handling machine driving, controlled by a computer, along a desired route and transporting cargo, such as a container, carried by it.

FIG. 2 shows a container handling machine 3 driving, e.g. controlled by a computer, along a desired route 17, transporting cargo it carries, which in this example is a container, to a container square 6 in a deposit area. The container handling machine 3 is provided with four scanning laser sensors 9 which in screening areas 10, 10' observe objects visible e.g. by an opening angle of 180 degrees, such as other container handling machines 3', containers 1 on the ground as well as particular landmarks 11 for navigation. The laser sensors 9 may be used both for preventing collisions with detected objects and for determining the location and position of the container handling machine 3 by means of the landmarks 11. Further, the roof of the container handling machine is provided with a GPS satellite positioning antenna 12 which may also be used for assisting with the positioning of the container handling machine 3.

Figure 3:
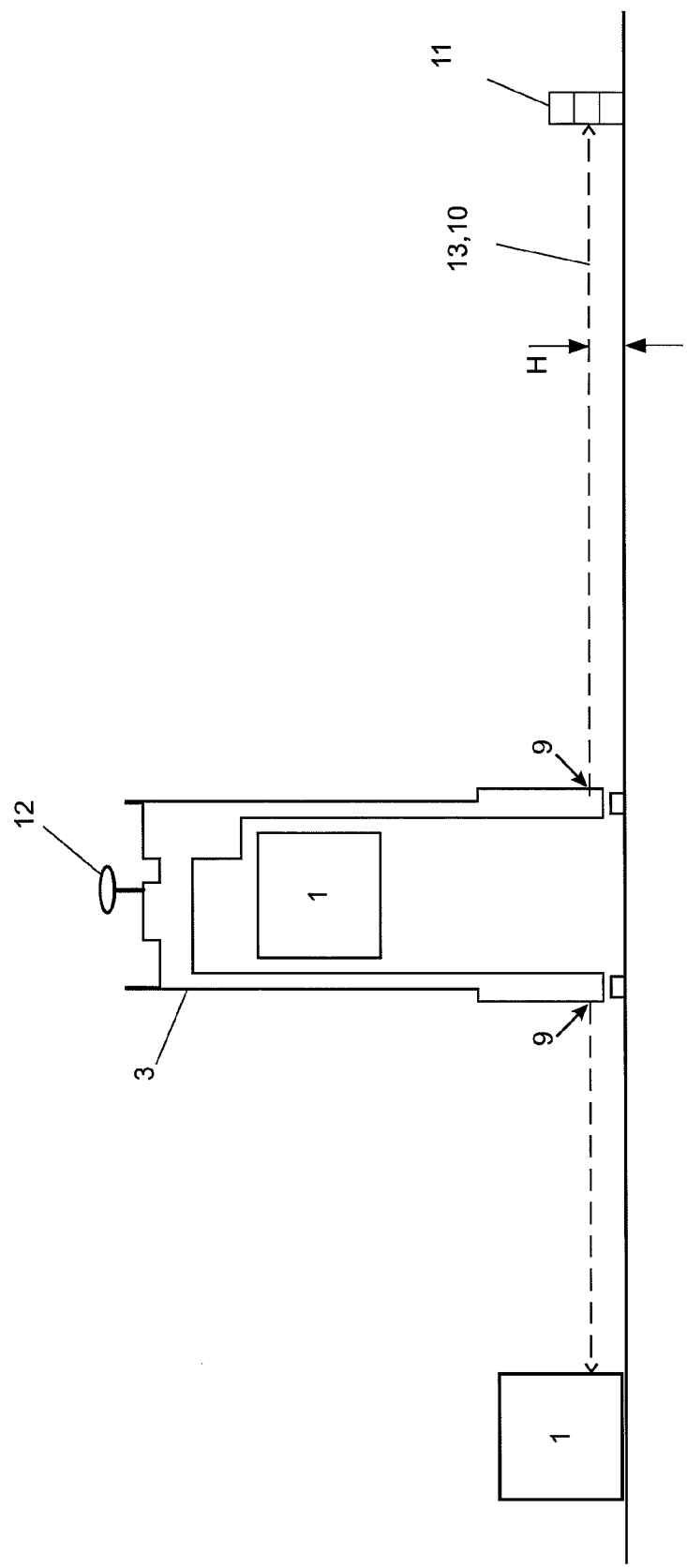
FIG. 3 is a side view showing the container handling machine carrying the container.

FIG. 3 is a side view showing the container handling machine 3 carrying the container 1. The container handling machine 3 is provided with scanning laser sensors 9 which observe objects in the vicinity, e.g. containers 1 on the ground, as well as particular landmarks 11 for navigation. The laser sensors 9 are installed horizontally at a height enabling them to be used both for preventing collisions with detected objects and for determining the location and position of the container handling machine 3 by means of the landmarks 11. The heights of the landmarks 11 and the laser sensors 9 have been selected such that the laser beam 13 hits the landmark 11 approximately in the middle, for instance. Further, the roof of the container handling machine is provided with a GPS satellite positioning antenna 12 which may also be used for assisting with the positioning of the container handling machine 3.

Referring next to FIGS. 2 and 3, the operation of the positioning system according to the invention and/or its preferred embodiments will be described next. In a typical but non-limiting embodiment of the invention, particular landmarks 11, which may be e.g. cylindrical in shape, are provided suitably spaced in a port area. An exemplary but non-limiting height of a landmark may be e.g. 1.5 meters, and its diameter correspondingly 60 ... 80 centimeters. The cylindrical landmarks may be made e.g. of concrete well ring elements of which e.g. three are stacked on top of one another (cf. FIG. 3). The landmarks are thus very inexpensive and durable in structure. The landmarks may be painted e.g. white or yellow in order to improve laser reflection. The round cylindrical shape of the landmark makes it easier to identify, since then its measured figure is independent of the viewing direction. However, as will be understood by one skilled in the art, this is not necessary for implementing the system according to the invention.

In an embodiment of the positioning system according to the invention, the container handling machine is provided with at least one scanning laser sensor 9; typically, however, with several, e.g. four, scanning laser sensors 9. With respect to the ground surface, the sensors may be installed at a height H which may be e.g. 0.5 to 1 m, preferably about 0.75 m (cf. FIG. 3). Laser scanning 10 then takes place horizontally. In such a case, the laser beams 13 in the vertical direction hit the landmark 11 somewhere in the middle, and despite any slight tilting of the container handling machine, the laser beams are still capable of seeing the landmark.

Figure 5:
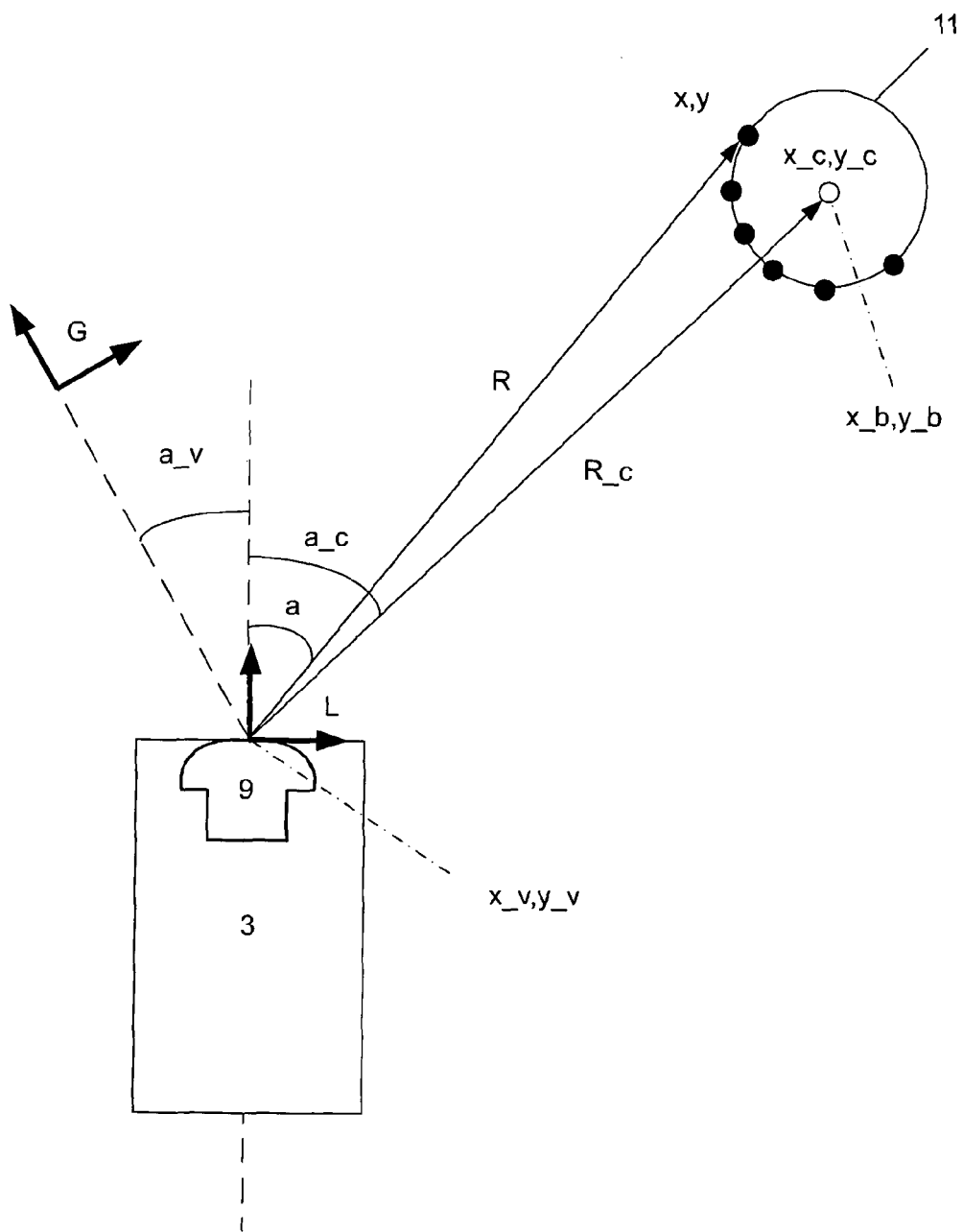
FIG. 5 shows coordinates and variables used in detecting a landmark and positioning a vehicle.

As will be understood by one skilled in the art, when, for instance, the laser beams of the scanning laser sensor hit the cylindrical landmark as shown in FIG. 5, it is possible from the angle values a and the distance readings R measured by the sensor 9 to calculate the measured coordinates (x, y) of the surface of the cylinder with respect to a coordinate system L bound to the sensor 9, by employing formula (1):

$$x = R\cos(a)$$
$$y = R\sin(a) \quad (1)$$

and from these, e.g. by using circle matching, to further determine the measured centre (x_c, y_c) of the cylinder (circle) in the coordinate system L. Next, we calculate, also in the coordinate system L, the measured angle value (a_c) of the centre of the cylinder and the measured distance value (R_c) e.g. by the formula:

$$R\_c = \text{sqrt}(x\_c^2 + x\_y^2)$$
$$a\_c = \arctan 2(y\_c, x\_c), \quad (2)$$

where, as is known, arctan 2( ) is the arcus function of four quadrants. Next, when we utilize information on the real, previously known location of the centre (x_b, y_b) of the measured landmark 11 in an absolute, bound-to-the-ground coordinate system G of the port, it is noted that the location and position (x_v, y_v, a_v) determined in the ground coordinate system G of the sensor 9 as well as the values in the coordinate system L measured by the sensor 9 implement the following equations:

$$x\_b = x\_v + R\_c \cos(a\_v + a\_c)$$
$$y\_b = y\_v + R\_c \sin(a\_v + a\_c) \quad (3)$$

As will be understood by one skilled in the art, detecting one rotationally symmetrical landmark 11 in the described manner does not unambiguously determine the location and position (x_v, y_v, a_v) of the sensor 9 and simultaneously the container handling machine 3 since there are three variables to be solved but only two mathematical equations. If the position (a_v) has been determined earlier and it has been maintained e.g. by means of a gyroscope, the group of equations (3) may be solved and the location of the container handling machine be determined. If the shape of the landmark were clearly asymmetric and sufficiently large (a container as a landmark, for instance) in order to also enable the measured position of the landmark in the coordinate system L (phi_c) to be determined at a sufficient accuracy, the location and position (x_v, y_v, a_v) of the container handling machine were then unambiguously determinable e.g. by solving the group of equations:

$$x\_b = x\_v + R\_c \cos(a\_v + a\_c)$$
$$y\_b = y\_v + R\_c \sin(a\_v + a\_c)$$
$$phi\_b = a\_v + phi\_c \quad (4)$$

The variable phi_b herein is the known position of the landmark in the ground coordinate system G. Here, the quantities (x_b, y_b, a_c, R_c, phi_c) associated with the location of the landmark would naturally refer to the coordinates of the selected reference point, e.g. centre of gravity, of the landmark rather than expressly to the centre of the circle.

However, as far as the practical application of the invention is concerned, it is easier to provide the port area with small landmarks (as the described cylinders), in which case the procedure according to equation (5) would be useless, since determination of the measured direction (phi_c) of the small landmark 11 would be inaccurate. Then, according to an embodiment of the invention, observations about two separate landmarks (landmarks 1 and 2) are combined in order to determine the location (x_v, y_v) and position (a_v) of the container handling machine. As will be understood by one skilled in the art, by monitoring two separate landmarks 1 and 2 that can be placed far from one another (farther than how much the size of one landmark could practically be increased) the accuracy of position and location determination is also improved considerably.

If, according to an embodiment of the invention, the landmarks 1 and 2 are visible simultaneously in the field of vision of the same sensor 9, it is possible to mathematically form a group of for equations and three unknown variables:

$$x\_b1 = x\_v + R\_c1 \cos(a\_v + a\_c1)$$
$$y\_b1 = y\_v + R\_c1 \sin(a\_v + a\_c1)$$
$$x\_b2 = x\_v + R\_c2 \cos(a\_v + a\_c2)$$
$$y\_b2 = y\_v + R\_c2 \sin(a\_v + a\_c2), \quad (5)$$

The location (x_v, y_v) and position (a_v) of the container handling machine are unambiguously determinable from the equation group (5) when (x_b1, y_b1) and (x_b2, y_b2) are the known coordinates of the landmarks in the ground coordinate system G and the distances R_c1 and R_c2 as well as angles a_c1 and a_c2 the detected distances and directional angles of the landmarks 1 and 2 in the coordinate system L of the sensor 9. If, according to another embodiment of the invention, the landmarks 1 and 2 are visible simultaneously, but in the field of vision of two separate sensors 9 installed in the container handling machine, e.g. such that sensor a sees the landmark 1 and sensor b sees the landmark 2, the situation may easily be returned to conform with that of equation (5) and solved accordingly, since e.g. the readings measured by sensor b may first by means of equation (1) be converted into an xy coordinate system (x_c2, y_c2) and then by means of a slightly modified equation (2) transferred to be a virtual reading of sensor a in the following manner:

$$R\_c2 = \text{sqrt}([x\_c2 + XB]^2 + [x\_y2 + YB]^2)$$
$$a\_c2 = \arctan 2([y\_c2 + XB], [x\_c2 + YB]),$$

where (XB, YB) is the known location of sensor b in the coordinate system L of sensor a.

However, as far as the practical application of the invention is concerned, it cannot be assumed that the sensors 9 of the container handling machine would continuously see two landmarks simultaneously, or even one landmark constantly. Visibility towards the landmarks may temporarily be obscured e.g. when other container handling machines 3 drive past a landmark or when e.g. the sun shines low from behind the landmark 11 in the direction of the laser beam 13. Thus, in practice it is often necessary to support the above-disclosed methods by a so-called dead reckoning method.

Dead Reckoning

Figure 6:
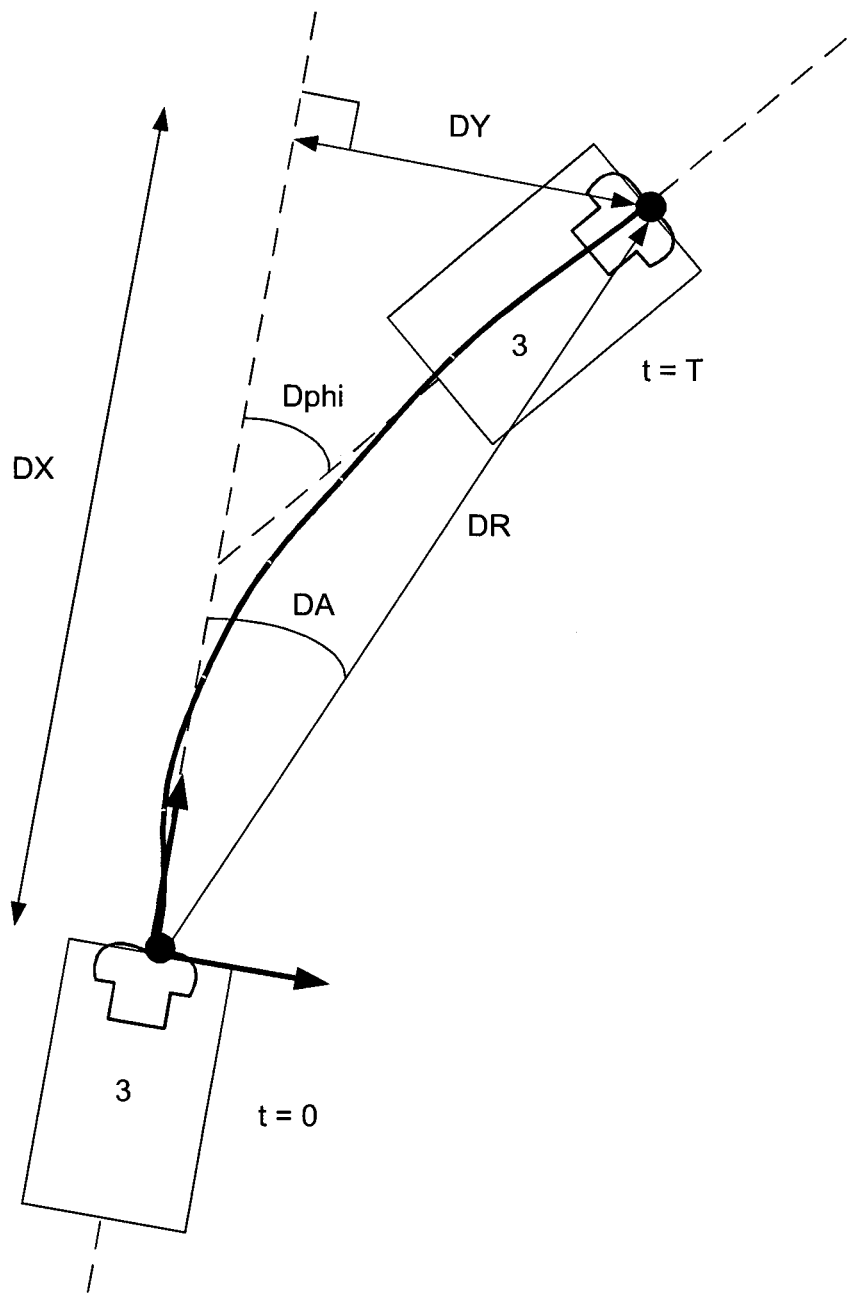
FIG. 6 illustrates variables used in dead reckoning.

As is known to one skilled in the art, dead reckoning (odometry) is a general name for methods wherein a relative change in the location of a vehicle is measured by summing up cumulatively the travelled distance and travel distance. FIG. 5 shows coordinate systems and variables used in detecting a landmark 11 and positioning a vehicle 3. FIG. 6 illustrates variables DX, DY, Dphi, DR, DA used in dead reckoning. Referring to FIGS. 5 and 6, the relative change in the location of a vehicle may be maintained by dead reckoning, e.g. according to formula (7):

$$X(t+Dt)=X(t)+Ds \cos[phi(t)]$$

$$Y(t+Dt)=Y(t)+Ds phi[phi(t)]. \quad (7)$$

Here, Ds is the distance travelled by the vehicle 3 during a time unit (t . . . t+Dt), phi(t) is the travel direction of the vehicle at time t, and X(t) and Y(t) are the location of the vehicle at time t. When the coordinate system bound to the ground is selected such that the initial location and initial direction of the vehicle are selected to be zero and the travelled distance is, according to formula (7), summed up iteratively over a period of time T, a change in the location (DX, DY) as well as a change in the travel direction (Dphi) of the vehicle during the period of time T have been determined as follows:

$$DX=X(T), \text{ when } X(0)=0$$

$$DY=Y(T), \text{ when } Y(0)=0$$

$$Dphi=phi(T), \text{ when } phi(0)=0 \quad (8)$$

This may be further converted into a polar coordinate system, which gives the distance (DR) between the starting and end points as well as the directional angle (DA) of the end point with respect to the start direction phi(0) of the vehicle 3:

$$DR=\text{sqrt}(DX^2+DY^2)$$

$$DA=\arctan 2(DY,DX). \quad (9)$$

As is previously known, the distance Ds travelled by the vehicle 3 during time unit Dt may be measured e.g. by a distance measurement sensor 18 installed in a wheel or transmission of the vehicle 3, e.g. a pulse encoder measuring rotation of the wheel. The angle Da rotated by the wheel may be converted into a distance Ds travelled on the ground when a distance measurement coefficient C_odo, i.e. the effective rolling radius of the wheel, is known.

$$Ds=C\_odo\,Da \quad (10)$$

However, it is not a simple task to determine the effective accurate rolling radius of the wheel since in the case of a container handling machine 3 travelling on rubber tyres in particular the rolling radius changes e.g. when the load (e.g. the weight of a container being carried) changes. The method according to the invention provides a solution to this problem and an accurate way to correct an error in the effective distance measurement coefficient of the vehicle 3. In the following, we assume that the assumed distance measurement coefficient (C_est) is erroneous such that:

$$C\_est=K\_gain\,C\_odo, \quad (11)$$

where K_gain differs from value 1, in which case, as will be understood by one skilled in the art, we are measuring too long or too short a travelled distance. Then, the distance between the starting and end points calculated from formula (9) is also erroneous such that:

$$DR\_est=K\_gain\,DR. \quad (12)$$

As will be understood by those skilled in the art, the error in the distance measurement coefficient has no influence on determining the direction DA of the end point according to formula (9). In the following, it will be shown how the method according to the invention solves an unknown scaling coefficient K_gain.

As is also previously known, the relative travel direction phi(t) of the vehicle 3 may be determined e.g. by means of a Fibre Optical Gyroscope or FOG. In such a case, the navigation point of the vehicle 3 is typically selected to be a location wherein the travel direction of the navigation point is the same as the direction of the body of the vehicle. Such a location e.g. in front-wheel steered vehicles (such as a car) resides on the rear axle. It is then easy to use e.g. a gyroscope sensor for measuring both changes in the direction of the body of the vehicle 3 and the travel direction of the vehicle. As will be understood by one skilled in the art, the system according to the invention may also use other sensors measuring the direction of the body or the travel direction of the vehicle. As far as the invention is concerned, it is essential to note that no absolute travel direction measurement (e.g. compass heading) is required from the direction measurement but a relative measurement of a change in the travel direction (e.g. angular velocity multiplied by time) will suffice. As will naturally be understood by one skilled in the art, a sensor measuring the absolute travel direction is also suitable, although not necessary, for implementing the system according to the invention.

An alternative manner according to the invention of implementing dead reckoning, i.e. determination of relative movement (DX, DY), is based on GPS positioning, on monitoring and integrating a phase of a carrier wave of GPS signals (accumulated Doppler range) in particular. As is known, by monitoring the phase of the carrier wave L1 of GPS signals, it is possible to determine the relative movement (DX, DY) of a GPS antenna 12 accurately, even at an accuracy of centimeters, without having to solve the location of the GPS antenna. The movement (DX, DY) determined by this method is also determined in a coordinate system directed with respect to the ground (e.g. in a WGS84 coordinate system), which provides the system according to the invention with an additional advantage which, however, is not necessary for the operation of the invention. As is known to one skilled in the art, solving the (differential) location of the GPS antenna 12 at a corresponding accuracy of centimeters would require the use of a considerably more expensive, dual-frequency GPS apparatus and measurement of two carrier waves L1, L2. In addition, determining an absolute location by a method called RTK takes a considerably long time (up to two minutes) after GPS signal losses. Instead, the relative movement (DX, DY) of the GPS antenna 12 may be in real time, immediately after a sufficient number of satellites are visible.

Next, it will be explained how the method according to the invention operates by dead reckoning when the sensors 9 of the vehicle 3 do not continuously see two landmarks 11, 11 simultaneously, or even one landmark 11 constantly. Let us assume that the sensor 9 of the vehicle 3 sees the landmark 1 at time t=0, and the landmark 2 at time t=T. The distance (DR) moved between detection of the landmarks (t=0 . . . T) and the direction with respect to the start direction (DA) of the vehicle as well as the recorded change in the direction of the vehicle Dphi have been measured by the above-described dead reckoning method. Then, the equation group according to formula (5) changes into:

$$x\_b1=x\_v+R\_c1 \cos(a\_v+a\_c1)$$

$$y\_b1=y\_v+R\_c1 \sin(a\_v+a\_c1)$$

$$x\_b2=x\_v+K\_gain\,DR \cos(a\_v+DA)+R\_c2 \cos(a\_v+Dphi+a\_c2)$$

$$y\_b2=y\_v+K\_gain\,DR \sin(a\_v+DA)+R\_c2 \sin(a\_v+Dphi+a\_c2). \quad (13)$$

Now, as will be understood by one skilled in the art, the four equations of formula (13) enable four unknowns to be solved, namely the initial location and direction (x_v, y_v, a_v) of the vehicle 3 as well as the unknown distance measurement coefficient error (K_gain). As was shown above, for the sake of the method it is not essential whether the same sensor 9 sees the landmarks 1 and 2 at times 0 and T, or whether two different sensors (a and b) see the landmarks 1 and 2 at times 0 and T. Since the distance moved between the landmarks and the position (DR, DA, Dphi) are also known, the end location and end direction of the vehicle are naturally also known.

As will also be understood by one skilled in the art, dead reckoning may subsequently be used (in accordance with formula (7) for instance) for maintaining the location information on the vehicle 3 until the next landmark 11 is detected. As will further be understood by one skilled in the art, the correction coefficient (K_gain) of the dead reckoning coefficient solved from formula 13 may from now on be utilized in dead reckoning, whereby a dead reckoning estimate according to formula (7) about the location of the vehicle is considerably more accurate than without the above-disclosed correction according to the invention.

In the system according to the invention, the landmarks 11 may be provided in the port area suitably spaced, e.g. at intervals of 50 meters, whereby, typically, the vehicles 3, such as container handling machines, see at least one landmark 11 continuously, excluding short breaks e.g. when another container handling machine 3 drives past the landmark. As will be understood by one skilled in the art, when the landmark 11 is typically visible for a longer period of time, it is possible to either use the most recent detection for determining the values (R_c2, a_c2) of formula (13) or, alternatively, to average the detections of the same landmark in order to improve measurement accuracy.

If the landmarks 11 are mutually identical in shape and size, the method naturally has to keep records of which detection 14 made by the sensor 9 corresponds to which landmark. When the vehicle at a reasonable accuracy knows its current location and direction (x_v, y_v, a_v), as well as the known locations (x_b, y_b) of the landmarks, one skilled in the art understands that the task is relatively easy since it is then possible in advance to classify detections 14 made within a certain area to be associated with a certain landmark 11. Further, detections 14 that do not match any known landmark (or detection groups 14 that in shape and size do not correspond to known dimensions of the landmarks) can be rejected as erroneous echoes from other objects in the port area.

When starting the system, it is possible either to separately communicate the initial location and direction (x_v, y_v, a_v) of the vehicle 3 to the computer of the vehicle or to start the system at some known location, for instance. It is also possible to use a separate positioning system to be installed in a vehicle, such as a GPS system, for roughly positioning the vehicle. It is then also possible to build a combined positioning system wherein navigation carried out by means of landmarks would only be used in areas wherein the GPS positioning is not working, for instance. In situations wherein a vehicle is provided with laser sensors 9 in any case, e.g. in order to avoid collisions, a combination solution is cost-efficient.

Measurements (a,R) made by a sensor 9 are converted into coordinates (x,y) in the coordinate system L bound to the sensor 9 and the vehicle 3. Next, in the case of a cylindrical landmark 11, for instance, in to a measured point system (x,y) a circle is adapted whose centre (x_c,y_c), i.e. in a general case the centre of gravity of the landmark 11, is solved. The centre of gravity (x_c,y_c) of the landmark, in turn, is converted back to distance and direction data (R_c, a_c) in the coordinate system L bound to the sensor 9. Next, the calculated values are utilized for determining the location and position (x_v, y_v, a_v) of the sensor 9 and the vehicle 3 in the coordinate system G bound to the ground, utilizing the known position (x_b, y_b) of the landmark 11 in the coordinate system G bound to the ground.

Figure 7:
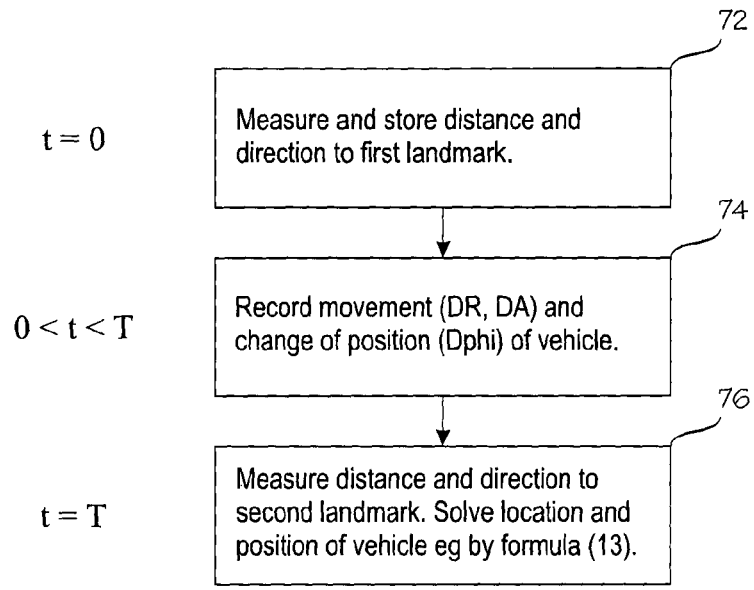
FIGS. 7 and 8 show different techniques for positioning a vehicle in a situation wherein landmarks may sometimes disappear from the sight of the vehicle.
Figure 8:
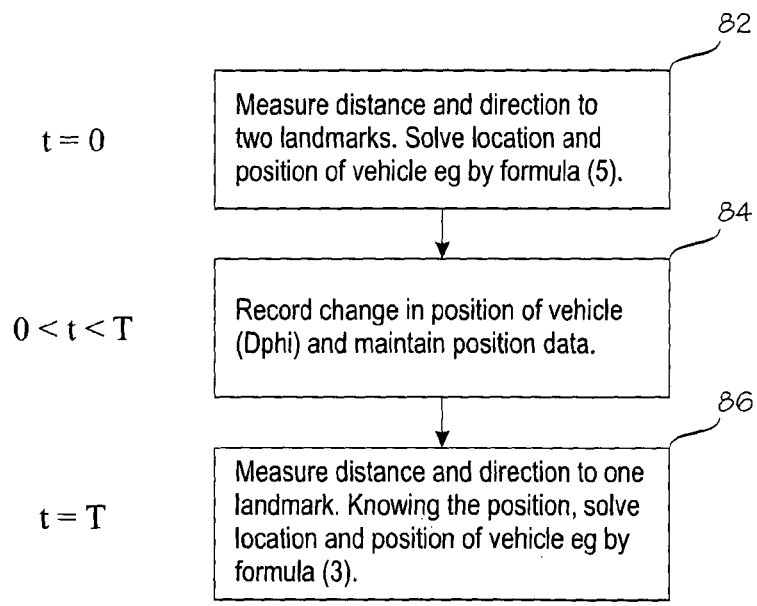

FIGS. 7 and 8 show different techniques for positioning a vehicle in a situation wherein landmarks may sometimes disappear from the sight of the vehicle. The technique of FIG. 7 is suitable for a situation wherein at a certain point of time, which is designated as t=0, one landmark is detected. At time t=0, in step 72, the distance and bearing from the vehicle to this first landmark are measured. The measurement results are stored for later processing. Between points of time 0 and T, in step 74, the movement (DR, DA) as well as the change in the position (Dphi) of the vehicle are recorded. At time t=T, in step 76, the distance and direction to another landmark are measured. It is now possible to solve the location and position of the vehicle by formula (13), for instance.

The technique of FIG. 8 is suitable for a situation wherein at a certain point of time, which is designated as t=0, two landmarks are detected. At time t=0, in step 82, the distance and direction from the vehicle to these two landmarks are measured. It is now possible to solve the location and position of the vehicle by formula (5), for instance. The measurement results are stored for later processing. Between points of time 0 and T, in step 84, the change in the position (Dphi) of the vehicle is recorded, and this information is maintained for later processing, at least until the next landmark is detected. At time t=T, in step 86, the distance and direction to one landmark are measured. Knowing the position, it is possible to solve the location of the vehicle by formula (3), for instance.

It will be apparent to a person skilled in the art that as technology advances, the basic idea of the invention may be implemented in many different ways. The invention and its embodiments are thus not restricted to the examples described above but may vary within the scope of the claims.

The invention claimed is:

1. A system for determining a location of a vehicle, the system comprising:
   at least one scanning distance sensor installed in the vehicle and configured to measure distance and direction from the vehicle to at least two landmarks of a plurality of landmarks, wherein locations of the plurality of landmarks is known to the system;
   a processor configured to:
      store in memory locations of the at least two landmarks;
      determine a shape of at least one scanned object by measuring a plurality of directions and distances from the vehicle to the at least one scanned object, and accept the scanned object as a landmark if the determined shape corresponds to a stored shape of at least one landmark;
      determine an initial location and initial heading of the vehicle based on measured distances and directions from the vehicle to the at least two landmarks, and on a recorded movement and change of heading of the vehicle between times the at least two landmarks are observed;
   and when only one landmark of the at least two landmarks is visible, the processor is configured to:
      record a change in heading and store heading data of the vehicle;
      measure distance and direction from the vehicle to the only one landmark;

determine an updated location of the vehicle based on at least the location of the only one landmark as well as the distance and direction from the vehicle to the only one landmark, wherein the system is configured to use the updated location for navigating the vehicle.

2. The system as claimed in claim 1, wherein the processor is further configured to determine a change in location of the vehicle by utilizing satellite positioning.

3. The system as claimed in claim 1, wherein the processor is further configured to determine a change in location of the vehicle by monitoring a travel direction of the vehicle as well as a distance measurement sensor installed in the vehicle, wherein calibration data of the distance measurement sensor is based on the locations of the plurality of landmarks known to the system.

4. The system as claimed in claim 1, wherein the processor is further configured to determine the location of the vehicle by employing dead reckoning if no landmarks are detectable.

5. The system as claimed in claim 1, wherein the at least one landmark is cylindrical in shape, and wherein the shape of the landmark is independent from the direction from the vehicle to the landmark.

6. The system as claimed in claim 1, wherein the distance sensor is a laser sensor.

7. The system as claimed in claim 1, wherein the processor is further configured to slow down or stop the vehicle based on an obstacle detected by the distance sensor in a travel direction of the vehicle.

8. The system as claimed in claim 1, wherein the processor is further configured to control the vehicle automatically.

9. The system as claimed in claim 1, wherein the vehicle is a container handling machine.

10. The system as claimed in claim 1, wherein the processor is further configured to determine an unloading site of cargo transported by the vehicle by determining the location of the vehicle at a time when the vehicle unloads the cargo.

11. The system as claimed in claim 10, wherein the processor is further configured to identify the cargo based on a site from which the vehicle picks up the cargo.

12. The system as claimed in claim 1, wherein the vehicle is configured to move unmanned.

13. A method for determining a location of a vehicle, the method comprising:
using at least one scanning distance sensor installed in the vehicle to obtain distance and direction from the vehicle to at least two landmarks of a plurality of landmarks, wherein locations of the plurality of landmarks are known to a data processing system;
using the data processing system to:
store in memory locations of the at least two landmarks;
determine a shape of at least one scanned object by measuring a plurality of directions and distances from the vehicle to the at least one scanned object, and accept the scanned object as a landmark if the determined shape corresponds to a stored shape of at least one landmark;
determine an initial location and initial heading of the vehicle based on measured distances and directions from the vehicle to the at least two landmarks, and on a recorded movement and change of heading between times the at least two landmarks are observed;
and when only one landmark of the at least two landmarks is visible, using the data processing system to:
record a change in heading and store heading data of the vehicle;
measure distance and direction from the vehicle to the only one landmark;
determine an updated location of the vehicle based on at least the location of the only one landmark as well as the distance and direction from the vehicle to the only one landmark; and
navigating the vehicle using the updated location.

14. The method as claimed in claim 13, further comprising determining a change in location of the vehicle by monitoring a travel direction of the vehicle as well as a distance measurement sensor installed in the vehicle, wherein calibration data of the distance measurement sensor is based on the locations of the plurality of landmarks known to the system.

15. The method as claimed in claim 13, further comprising determining the location of the vehicle by employing dead reckoning if no landmarks are detectable.

16. The method as claimed in claim 13, wherein at least one landmark is cylindrical in shape.

17. The method as claimed in claim 13, wherein the distance sensor is a laser sensor.

18. A software product on a non-transitory computer-readable storage medium for a data process sing device in a vehicle for determining a location of the vehicle in an environment provided with a plurality of landmarks, the vehicle comprising at least one scanning distance sensor installed in the vehicle and configured to measure distance and direction from the vehicle to at least two landmarks of the plurality of landmarks;
the software product controls the data processing device to carry out a method comprising the following steps:
storing in memory locations of the at least two landmarks of the plurality of landmarks;
determining a shape of at least one scanned object by measuring a plurality of directions and distances from the vehicle to the at least one scanned object, and accepting the scanned object as a landmark if the determined shape corresponds to a stored shape of at least one landmark; and
determining an initial location and initial heading of the vehicle based on measured distances and directions to from the vehicle the at least two landmarks, and on a recorded movement and change of heading between times the at least two landmarks are observed;
and when only one landmark of the at least two landmarks is visible:
recording a change in heading and storing heading data of the vehicle;
measuring distance and direction from the vehicle to the only one landmark;
determining an updated location of the vehicle based on at least the location of the only one landmark as well as the distance and direction from the vehicle to the only one landmark; and
navigating the vehicle using the updated location.

* * * * *